(12) United States Patent
Martin et al.

(10) Patent No.: US 7,818,573 B2
(45) Date of Patent: Oct. 19, 2010

(54) REMOTE CONTROL OF A SECURITY SYSTEM USING E-MAIL

(75) Inventors: Christopher D. Martin, Plainview, NY (US); James W. Kern, Jr., East Islip, NY (US)

(73) Assignee: Honeywell International Inc., Morristown, NJ (US)

( * ) Notice: Subject to any disclaimer, the term of this patent is extended or adjusted under 35 U.S.C. 154(b) by 869 days.

(21) Appl. No.: 11/647,918

(22) Filed: Dec. 29, 2006

(65) Prior Publication Data

US 2008/0162364 A1 Jul. 3, 2008

(51) Int. Cl.
*H04L 9/32* (2006.01)

(52) U.S. Cl. .............. 713/170; 726/2; 726/4; 726/21; 726/27

(58) Field of Classification Search .............. None
See application file for complete search history.

(56) References Cited

U.S. PATENT DOCUMENTS

| | | | |
|---|---|---|---|
| 6,584,564 B2 * | 6/2003 | Olkin et al. | 713/152 |
| 6,839,717 B1 * | 1/2005 | Motoyama et al. | 707/104.1 |
| 6,928,148 B2 | 8/2005 | Simon et al. | |
| 7,042,350 B2 | 5/2006 | Patrick et al. | |
| 7,113,090 B1 * | 9/2006 | Saylor et al. | 340/539.18 |
| 7,394,359 B2 * | 7/2008 | Eskildsen | 340/539.1 |
| 2002/0007453 A1 | 1/2002 | Nemovicher | |
| 2003/0236847 A1 * | 12/2003 | Benowitz et al. | 709/206 |
| 2004/0216009 A1 * | 10/2004 | Kihara | 714/37 |
| 2005/0216302 A1 | 9/2005 | Raji et al. | |
| 2006/0294377 A1 * | 12/2006 | Ho et al. | 713/170 |
| 2007/0022162 A1 * | 1/2007 | Thayer et al. | 709/206 |

FOREIGN PATENT DOCUMENTS

| | | |
|---|---|---|
| AU | 2005/217992 A1 | 10/2005 |
| DE | 19913573 | 9/2000 |
| EP | 1536382 A2 | 6/2005 |
| WO | WO 03/098908 | 11/2003 |

OTHER PUBLICATIONS

Basic Operation Guide, Section 4, 4286 VIP Module Installation Instructions, pp. 4-1-4-8. Date of the publication Oct. 1999.

* cited by examiner

*Primary Examiner*—Taghi T Arani
*Assistant Examiner*—Amir Mehrmanesh
(74) *Attorney, Agent, or Firm*—Husch Blackwell Welsh Katz (57) ABSTRACT

A system and method for controlling a local security system from a remote location using e-mail. The system receives an e-mail message from a remote e-mail terminal that contains at least one control instruction for controlling the local security system authenticate the e-mail message based upon at least one authentication criterion and authorizes a sender of the e-mail message based at least upon an e-mail address. If the sender is authorized and the message is authentic, the control instruction is transmitted to the local security system for execution. The control e-mail message can be encrypted using an encryption key for added security.

19 Claims, 8 Drawing Sheets

From: John Doe @ xyz.com

To: Remote @ control.securityco.com

Header: John Doe 124 High Street 123456789 Blue

1234 ARM-AWAY

| Subscriber | Address | Account No. | Security Code | Pass Code | Allowable E-mail Address |
|---|---|---|---|---|---|
| | | | | | |

FIG.7

| Allowable E-mail Address | AIP1 | AIP2 | AIP3 |
|---|---|---|---|
| | | | |

REMOTE CONTROL OF A SECURITY SYSTEM USING E-MAIL

BACKGROUND OF THE INVENTION

1. Field of the Invention

The invention relates to a system and method for controlling a security system from a remote location. More specifically, the invention relates to remotely accessing and controlling a security system by transmitting an electronic message.

2. Background

Security systems, such as for both commercial and residential use, have become commonplace as people seek to protect themselves and their property. A security system includes any life, safety, and property protection system. A typical security system includes a security device located at the commercial or residential property, a local monitoring station and a network operation center. Both the local monitoring station and the network operation center are remotely located from the security device.

Typically, a user (or installer) subscribes or registers the security device with one central monitoring station. The user provides the local monitoring station with information regarding the property that a security device is protecting and personal information. Each user is assigned a unique account number. These account numbers are stored in a server at the central monitoring station and a network operation center.

The security device typically includes a central control panel that communicates with a number of sensors via a wired or wireless path. The control panel has the ability to notify local emergency services and/or a local monitoring station of an alarm condition via a telephone dialer to the remote monitoring facility or local emergency services. A communication network device, such as a modem, allows the control panel to send and receive information via a communication link to a communication network. The communication network can be a telephone network and the communication link is a telephone line; however, the control panel can also send and receive information via a computer network, such as the Internet or GSM. The computer network may include a DSL or cable modem, and a network interface card, for example.

The security device also includes a user interface device such as a keypad with alphanumeric keys. This keypad can be wired or wireless. Typically, the security device owner can access and control the security device using the keys on the keypad. Alternatively, the owner might have a remote control device that transmits radio frequency signals to the keypad to control the system. For example, a control device can allow the owner to arm or disarm the device by depressing on button on the control device.

Alternatively, U.S. patent application Ser. No. 11/546,865, entitled Method and System for Controlling a Security System Using Near Field Communication, assigned to Honeywell International, Inc., describes controlling a security device using a remote object by the transmission of radio frequency signals to a target device when the remote object is in close proximity to the target device. An owner is able to arm or disarm the security system by holding the remote object with near field communication capability in proximity of either the keypad or an arming and disarming station to control the security systems.

However, all of the above-identified methods require the owner or operator of the security device to be located near the security device, i.e., within the premises. There is a need for an owner to be able to control or have access to features of the security device when the owner or operator is remote from the premises where the security device is located. U.S. application Ser. No. 11/451,973 entitled A Method and Apparatus for Using SMS short Code Messaging to Facilitate the Transmission of Status Update for a Security system, assigned to Honeywell International, Inc., describes a method and system that allows a user to send a request for a status update to a monitoring station from a remote device and receive status updates on the remote device. The owner or operator can send a predefined SMS message to an access server to generate a request for a remote status update. The owner can pre-register for such a service and define what information that the owner can receive. Based upon the predefined SMS message, the owner will receive the specified information. Additionally, an owner can send a specific SMS to remotely modify the status of the security device such as arming or disarming the security device.

Alternatively, Honeywell International Inc. has developed an interactive phone module for remotely controlling the security system using a telephone device. A telephone keyset or keypad is used in the same manner as the user interface keypad installed in the owner's home or business. Using the telephone device, the owner can arm, disarm or check the status of the security system from any location. For example, VISTA 4286VIP, a product which is available from Honeywell International, Inc., is used to input a desired control command into a telephone device that is in direct communication with the local security system.

The owner or operator would directly dial a telephone number of the home or business where the security device is located and enter a phone code and user pass code followed by a telephone command.

However, there is still a need for an owner of the security system or device to be able to remotely access and control the system in a secure manner without the need of a telephone device.

BRIEF SUMMARY OF THE INVENTION

Accordingly, disclosed is a method and system that allows an owner or operator to control a remote security system by sending a secure e-mail to a network operation center.

The method includes receiving an e-mail message from a remote e-mail terminal. The e-mail includes at least one control instruction for controlling the security system. The e-mail is authenticated based upon at least one authentication criterion. After the e-mail is authenticated, authorization of the sender is determined based upon at least upon an e-mail address. The control instruction is only transmitted to the local security system if the e-mail message is authenticated and the sender is authorized. The local security system will then execute or perform a function associated with the control instruction.

The e-mail message can be encrypted, using any known encryption method with an encryption key. The encryption software can be download to the remote e-mail terminal from a website maintained by a web server. An encryption key is pre-assigned for each subscriber and a corresponding decryption key, which can decrypt the encrypted e-mail, is assigned and stored in a network operation center. The encryption key is assigned through the website. The encryption key can be unique for each subscriber and the corresponding decryption key can be unique for each subscriber. The corresponding decryption key is stored in a central database and associated with a subscriber record for each subscriber.

The e-mail message will include personal information, a sender identifier, a security subscriber account number, a security identification and the at least one control instruction the e-mail message. This information can be in the header, subject field or body of the e-mail.

An e-mail message can be authenticated by comparing the personal information and security identification with information stored in a central database. Alternatively, the authentication step includes the substeps of searching a central database for a registered e-mail address that corresponds to subscriber information included in the e-mail message, assigning a random transaction number to an outgoing e-mail message; and transmitting the outgoing e-mail message to the registered e-mail address with the random transaction number. When the outgoing e-mail message is sent, the control method further includes the steps of waiting for a preset period of time for a response to the outgoing e-mail message from the registered e-mail address, and denying authentication if the response is not received within the preset period of time or not received from the registered e-mail address.

A comparison of the sender's e-mail address with an e-mail address that is previously registered and stored in the central database is used to determine authorization of the sender of the e-mail message. Additionally, a determination of authorization can further includes determining if authorization limiting parameter (ALP) corresponds to the e-mail address. An ALP can include a time or function. In order to authenticate and authorize the e-mail and sender, the e-mail message must be parsed and specific information extracted for the comparison.

The method further includes the step of determining the control instruction based upon information contained in the email after parsing the e-mail.

The method further includes the step of assigning a branded e-mail address used as a destination for the e-mail message. The branded e-mail address is assigned through a website which is accessible to a subscriber.

Additionally, the method includes maintaining a website that is accessible to a subscriber. The website is capable of receiving at least one e-mail address that the subscriber authorizes to send the at least one control instruction. All information received by the website is stored in a central database. The information is stored in a subscriber record containing information related to a subscriber.

Prior to any decryption of the e-mail or authentication of the e-mail, a determination is made if the received e-mail is junk. An e-mail is junk if it is not in an accepted format or if the e-mail should be encrypted but is not.

Also disclosed is a network operation center comprising an e-mail reception and transmission section for receiving and transmitting e-mail to a remote e-mail terminal, a message processor for receiving the e-mail from the e-mail reception and transmission section and for authenticating and authorizing control of the remote security system based upon at least certain information contained in the e-mail, a central database which includes subscriber information separated into subscriber records, and a transmission section for receiving the at least one control instruction from the message processor and transmitting a control instruction to the local security system. The received e-mail includes the control instruction for controlling a remote security system. The subscriber record can include at least one e-mail address authorized to control the remote security system. The message processor is capable of accessing the subscriber information in the central database for authenticating and authorizing.

The network operation center also includes a web server that maintains a website that is accessible to a subscriber. The website is capable of receiving at least one e-mail address that the subscriber authorizes to send the at least one control instruction. The web server forwards all subscriber information to the central database. Encryption software and any encryption keys, if needed, are available for downloading from the web server.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

The present invention includes a method and system for allowing a user to control his local security system from a remote location by sending an e-mail message containing at least one control instruction to a network operation center, as an intermediary.

The term "user" refers to any person that has the authorization to control and access features of a local security system, for example, a home or business owner, employee, or relative. A "local security system" refers to equipment installed in a residential or commercial property that detects undesired access, entry, occupation, or the presence of a hazard or the occurrences of an event within the designated space.

According to the invention, a user can pre-register one or more e-mail addresses that are authorized to send a control instruction. This registration process will be described later.

Figure 1:
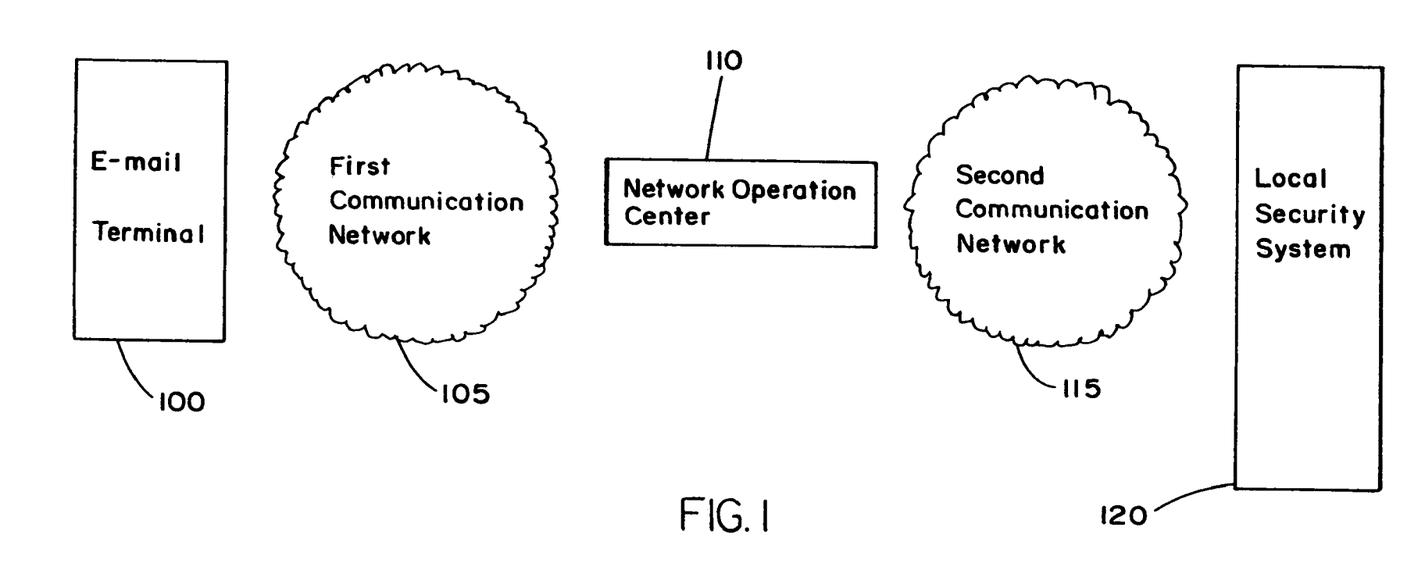
FIG. 1 is a diagram of the components of a system in accordance with an embodiment of the invention.

FIG. 1 illustrates a diagram of the control system in accordance with the invention. A user can send an e-mail having a control instruction using an e-mail terminal 100 to a network operation center 110 (NOC). An e-mail terminal 100 can be any device that is capable of sending an e-mail, such as, but not limited to, a computer, PDA, cellular telephone, laptop, cable television set top box and telephone. The e-mail terminal 100 will transmit the e-mail message using a first communication network 105. The first communication network 105 can be the Internet.

The Network operation center 110 will receive the e-mail process the information in the e-mail and forward the instruction to the local security system 120 using the second communication network 115. The second communication network can be any communication network capable of transmitting data being two devices, such as the Internet, cellular network (GSM), PSTN, etc.

Figure 2:
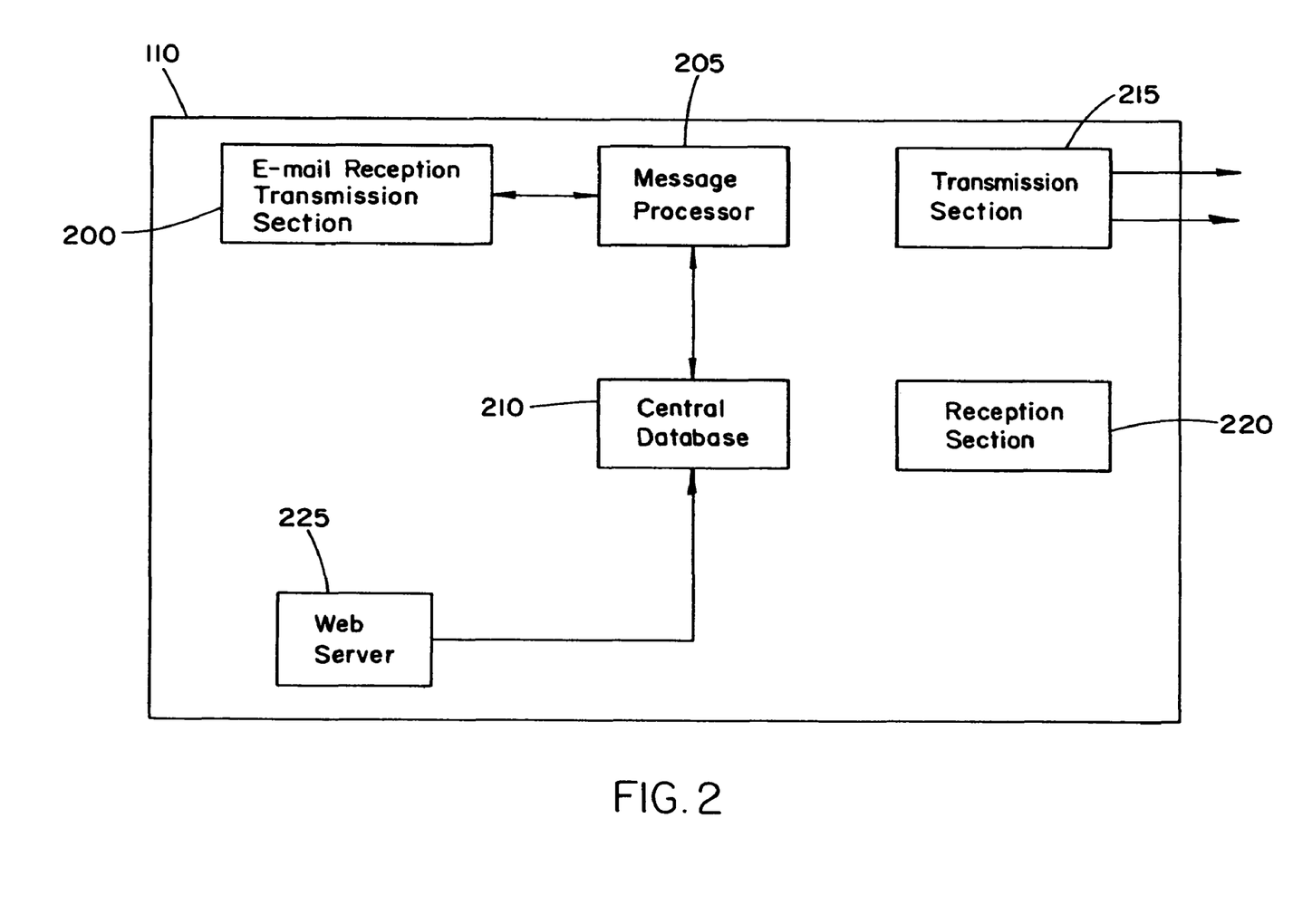
FIG. 2 illustrates a block diagram of the network operation center according to an embodiment of the invention.

FIG. 2 illustrates a block diagram of the network operation center 110 according to an embodiment of the invention.

The network operation center 110 includes an e-mail reception and transmission section 200, a message processor 205, a central database 210, a transmission section 215, a reception section 220 and a web server 225.

The e-mail reception and transmission section 200 receives e-mails from the e-mail terminal 100. The e-mail reception and transmission section 200 can be a mail server. The mail sever can include a storage means for storing the received control message. Alternatively, the control message can be stored in the central database 210. In another embodiment, the control message can be stored in a separate dedicated database in the NOC 110. The control message will be stored for a preset time period and then deleted. The e-mail reception and transmission section 200 forwards the received e-mail to the message processor 205. The message processor 205 will parse the e-mail and determine whether the sender is authorized to perform the instruction. If the sender is authorized, the message processor 205 will forward the instruction to the transmission section 215 to transmit the instruction to the local security system 120.

The central database 210 includes all subscriber and user information including account numbers, telephone numbers, pass codes, unique identification information, authorized e-mail addresses . . . etc.

The web server 225 provides host services for the host website that allows a subscriber to register to become a user of the system, i.e., to enable their subscriber account to have the e-mail control feature.

Figure 3:
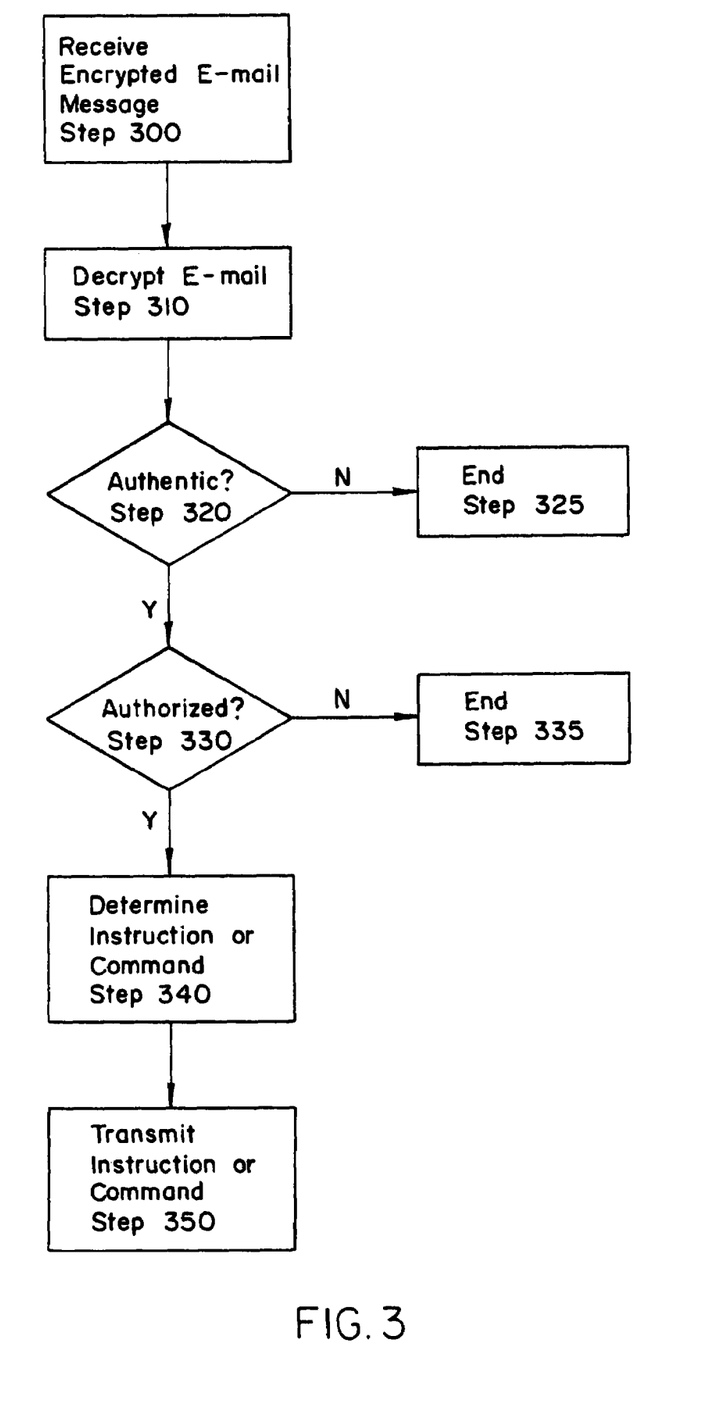
FIG. 3 illustrates a flow chart of the method of remotely controlling a local security system according to a first embodiment of the invention.

FIG. 3 illustrates a flow chart for the control method according to one embodiment of the invention.

The user transmits an e-mail from the e-mail terminal 100 to the NOC 110 addressed to a pre-assigned e-mail address. In this embodiment, the e-mail is encrypted. At step 300, the NOC 110 receives the encrypted e-mail, via the e-mail reception and transmission section 200. The message is forwarded to the message processor 205 for decryption and parsing. The message processor 205 decrypts the e-mail using a decryption key that is stored in the processor, at step 310. In one embodiment, the encryption software will be available as a plug-in for a mail client via the web server 225. A subscriber can download the encryption software during the registration process. For example, the encryption software can be compatible with a public key/private key encryption. The key will be available on the web server for downloading to the mail server. The corresponding key will be stored in the central database 210 and associated with the subscriber record. Alternatively, the mail client plug-in, i.e., encryption software can be sent to the subscriber by mail for installation by the subscriber. In another embodiment, the subscriber can download the encryption software using his web client and install the encryption software. In this embodiment, the key can be downloaded from the web sever 225 at the NOC 110. In one embodiment, the NOC 110 can assign a unique key to each subscriber. This unique key can be used to verify or authenticate the e-mail. The unique key will serve as a unique electronic signature for the e-mail and sender.

In another embodiment the same encryption key can be assigned to each subscriber.

According to one embodiment, before the message processor 205 authenticates the e-mail, the NOC 110 will determine if the e-mail is junk e-mail. In an embodiment where control e-mails are encrypted, an e-mail is junk if the e-mail is not encrypted or if the e-mail is not in a proper or accepted format. An e-mail is in proper format if the e-mail includes at least a valid subscriber account number. Any e-mail that is determined to be valid, i.e., not junk will be decrypted.

If the same encryption key was assigned to each subscriber, the NOC 110 will decrypt the e-mail using a single decryption key.

Once the e-mail is decrypted, the message processor 205 authenticates the message, at step 320. The message processor 205 searches the central database 210 for the e-mail address and subscriber information. If the subscriber information contained in the e-mail does not match any subscriber information in the central database 210, the process ends, at step 325. In an embodiment, the NOC 110 can transmit an authentication denied message to the sender's e-mail address. Or we might only send a message to a valid e-mail address in our database notifying them that a request to control their system was received by an unregistered address.

On the other hand, if the authentication is successful, i.e., subscriber information matches, the message processor 205 will determine if the e-mail was sent from an allowable source, at step 330. An allowable source is based upon whether the sender's e-mail address was pre-registered and given control authority. Additionally, to ensure security, the message processor 205 will check for a proper security identification in the e-mail. If both the sender's e-mail address and the security identification do not match the corresponding information in the central database 210, authorization will be denied and the process will end, at step 335. In an embodiment, the NOC 110 can transmit an authorization denied message to the sender's e-mail address. If both the sender's e-mail address and security identification match, authorization is successful, and the message processor 205 will then determine the control instruction, at step 340. The control instruction can be any instruction to modify a feature of the local security system 120, including, but not limited to arm-stay, disarm, and arm-away.

If a unique key is assigned to a subscriber, the message processor 205 will search the central database for the corresponding key that matches the sender's e-mail address. In this embodiment, the decryption process and authentication step is partially merged.

If the e-mail is decrypted using a key stored in the central database 210 corresponding the to sender's e-mail address, the authentication process is simplified. The message processor will only have to match the identification information in the e-mail with the subscriber record corresponding to the decryption key.

The e-mail will be authenticated if the account number matches. If not, the NOC 100 will notify the subscriber that the encryption key has been compromised and deactivate the encryption key.

Once the e-mail is authenticated, the e-mail address of the sender will be matched with the pre-registered e-mail. If the addresses match, the message processor will determine the control instruction in the same manner as described above.

After determining the control instruction, the message processor 205 will forward, the control instruction to the transmission section 215 for transmission to the local security system 120. In an embodiment the message processor 205 will also forward the user passcode to the transmission section 215. The control message sent from the NOC 110 will appear to the local security system as if it were received by the keypad.

In one embodiment, identification information will be included in the subject field of the e-mail. The identification information can include account numbers, unique security identification and/or passcode. The control instruction will be on the body of the e-mail.

In another embodiment, the control instruction can also be included in the subject field of the e-mail message. In another embodiment, all identification information and control information will be included in the body of the e-mail message.

While the above description of an e-mail includes a specific format for the control message the format is only presented by way of examples, other e-mail formats can be readily used.

In another embodiment of the invention, the e-mail can be generated using a proprietary e-mail format and protocol. This proprietary e-mail will be dedicated for controlling the local security system 120. For example, the e-mail format can include drop down window menus and checkboxes to streamline the control process. According to this embodiment, a subscriber can download the proprietary e-mail format from the web server 225. The subscriber will send a e-mail directly to the NOC using the proprietary e-mail format and protocol without the need for an additional mail client.

Figure 4:
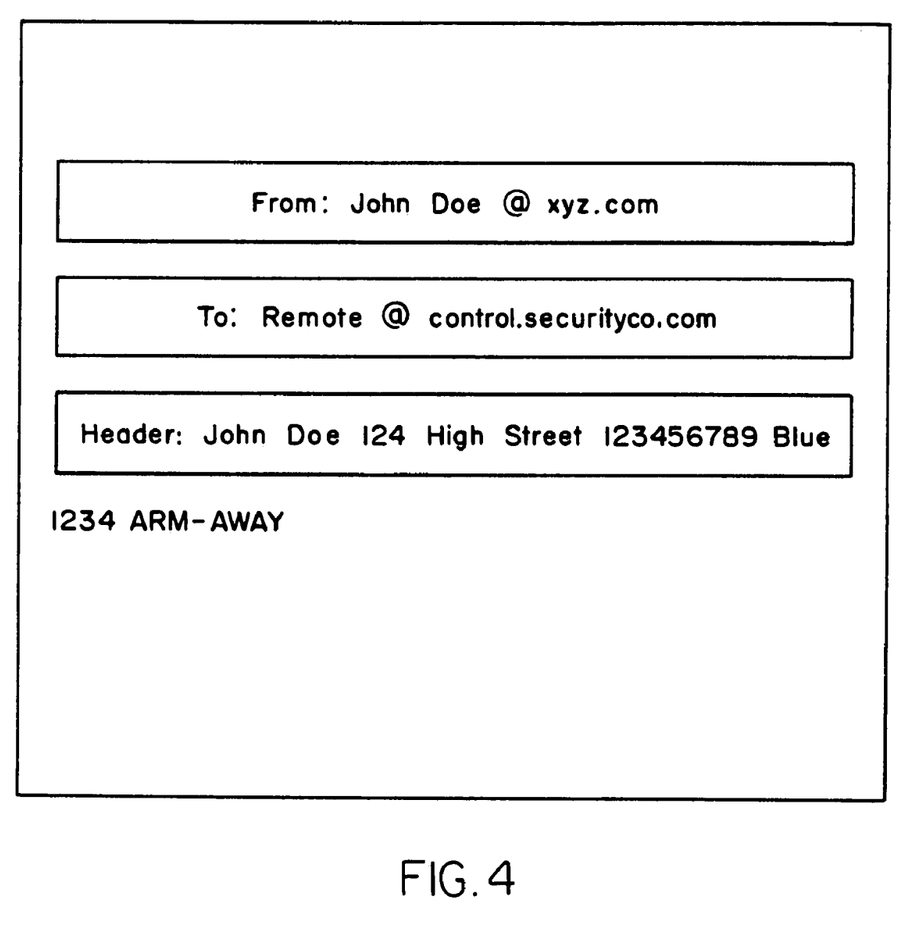
FIG. 4 illustrates an example of a control e-mail sent from the e-mail terminal according to the first embodiment of the invention.

FIG. 4 illustrates an example of a decrypted e-mail in accordance with one of the above example embodiments of the invention. As depicted, the e-mail 400 is sent to a predetermined dedicated e-mail address. This address is given to the user during the registration process. The "from" section should include the e-mail address that the user has registered. The identification information is included in the subject of the e-mail 400. The control instruction is included in the body of the e-mail. The message processor 205 includes parsing software that is capable of parsing the from/subject and body of an e-mail into various subparts, such a name, address, subscriber identification security identification code, user passcode and instruction. The name, address and account number of the person is used for the authentication. The e-mail address and security identification are used for authorization and the passcode and instruction are used to determine the intended control function.

In the above-described embodiment, the user e-mail terminal 100 needs to have encryption software and the ability to encrypt an e-mail message.

In another embodiment of the invention, the user can send an e-mail that is not encrypted to control the local security system 120. However, for security reasons, a different authentication and authorization procedure is needed to prevent personal account information and passcodes from being transmitted. According to the second embodiment, a sender of the control e-mail can be authenticated without the need to transmit an account number, passcode and other sensitive personal information.

Figure 5:
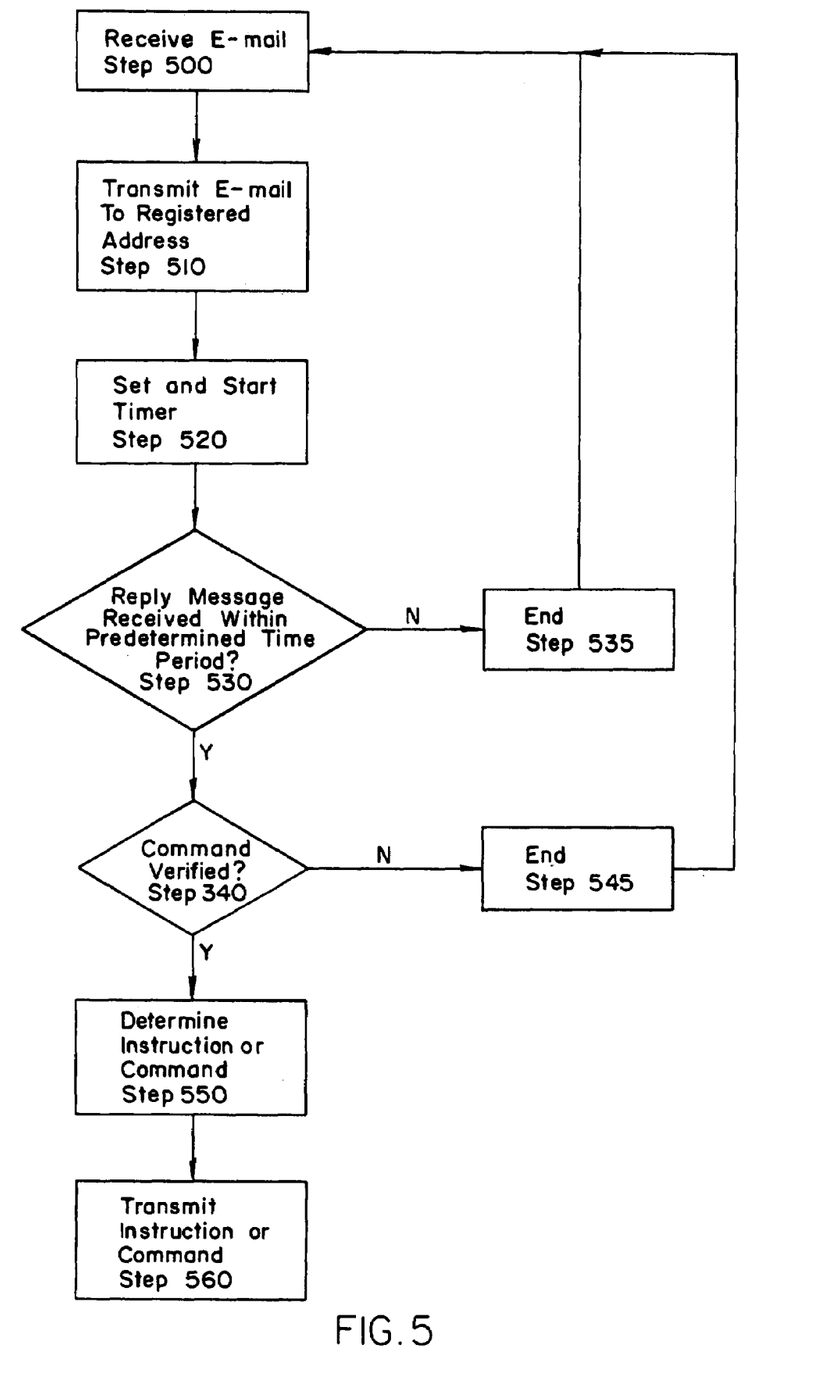
FIG. 5 illustrates a flow chart of the method of remotely controlling a local security system according to a second embodiment of the invention.

FIG. 5 illustrates the control method according to a second embodiment of the invention. In this embodiment, the user will send a first e-mail to the NOC 110 using the e-mail terminal 100. This first e-mail will only include the intended control instruction in the header. At step 500, the NOC 110 will receive the e-mail via the reception and transmission section 200. Upon receipt of the first e-mail, the message processor 205 will assign a random identification number to the request. The message processor 205 will search the central database 210 for a registered e-mail address that corresponds to the sender. At step 510, the message processor 205 will forward the registered e-mail address with random number to the reception and transmission section 200 for e-mailing. The random number will be e-mailed to the registered e-mail address with an instruction to respond or reply to this e-mail within a predetermined time and verify the command or instruction. This predetermined time can be adjusted.

At step 520, the message processor 205 will set and start a timer for a predetermined time period. For example, if the NOC 110 does not receive a reply within five minutes, the original request is ignored and denied. The message processor 205 will wait for the predetermined time period to receive the reply e-mail. The message processor 205 will determine if the timer expires prior to receiving a reply, at step 530. If the timer expires prior to receiving the reply, the process ends, at step 535. In an embodiment, the message processor 205 can cause the e-mail reception and transmission section 200 to send a "time-out" message to the sender of the first e-mail.

If the reply is received by the message processor 205, within the predetermined time, the message processor 205 will determine if the reply e-mail correctly verifies the command, at step 540. A command is verified if the sender replies "yes" in the header or the header includes the same command as the first e-mail message. If the reply e-mail message does not verify the command, then the process ends, at step 545. In an embodiment, the message processor 205 can cause the e-mail reception and transmission section 200 to send a "verification failure" message to the sender of the first e-mail and the reply e-mail.

If the command or instruction is verified, the message processor 205 will determine the instruction, at step 550. The determination of the instruction is performed in the same manner as described above. At step 560, the message processor will forward the control instruction to the transmission section 215 such that the control instruction can be sent to the local security system 120. Additionally, in an embodiment, the message processor will also forward the user passcode to the transmission section 215 for transmission.

The instruction and or passcode will be transmitted to the local security system 120 using a second Communication Network 115. In one embodiment, the second communication network is the Internet. The Internet connection between the local security system 120 and the NOC 110 can be used for reliable secure communications.

Prior to transmission of the instruction and/or passcode, the transmission section 215 will encrypt the data. The control instruction or message can be transmitted from the NOC 120 using an known transmission method such as AlarmNet, which is operated by Ademco, (a brand of Honeywell International, Inc. AlarmNet—A communications network operated by Ademco that uses Internet, Cellular, GSM, Mobitext, and other proprietary technologies. The network is used to upload and download alarm system configuration and operational data as well as act as a pathway for alarm system based events to be routed from the protected premises to an NOC 110.

For example, the second Communication Network 115 can be the Internet. In order to avoid firewall, the NOC 110 will wait for the local security system 120 to initiate contact with the NOC 110 periodically. Once a session is open, the NOC 110 will send the data to the local security system 120. The NOC 110 can use an AlarmNet-I communications network to transmit the encrypted instruction data. AlarmNet-I is a proprietary communication network operated by Honeywell International, Inc., which uses the Internet. The network is used to upload and download alarm system configurations and operational data. In this example, the transmission section 215 in the NOC 110 will be an AlarmNet-I transmitter to the Internet and received by an AlarmNet-I receiver at the local security system 120. Alternatively, the NOC 110 can use an Ethernet-based transmitter to send the instruction over the Internet. Another alternative is that the NOC 110 can use a modem device as the transmission section 215 to transmit the instruction over the Internet.

In another embodiment, the NOC 110 can transmit the instruction to the local security system 120 using a cellular network such as AMPS or GPRS. For example, the NOC 110 can include as the transmission section 215, a cellular antenna, e.g., an AlarmNet C transmitter or GPRS transmitter. AlarmNet-C (now AlarmNet-G for GSM) is a proprietary communication network operated by Ademco (a brand of Honeywell International, Inc.) that uses cellular communication network carriers. The AlarmNet C transmitter will route the instruction using the AlarmNet-C communication network.

In another embodiment, the NOC 110 can transmit the instruction to the local security system 120 using a standard telephone network using analog tones, frequency-shift keying or other tone patterns.

As described above, a subscriber to security system can register for the remote e-mail control system using a website maintained and managed by a web server 225 in the NOC 110. Using the website, a subscriber can create a user e-mail control message account in the central database. This account will be accessed by the message processor 205 each time a user sends an e-mail containing at least one control instruction. The e-mail control message account is created using a computer or any device that is capable of connecting to the Internet using a standard web browser. The subscriber logs into the website using a passcode and login name provided by a security system installer. The website is exposed to the Internet via a public IP address. Information entered onto the website is received by the web server 225 and stored as a data record in the central database 210.

The subscriber will enter the personal subscriber information into each field entry. The personal subscriber information can include a name, billing address, accounting number, and the address of the protected premises. To activate the remote e-mail messaging feature, the subscriber will enter at least one e-mail address from which the control system is authorized to accept an e-mail with the control instruction. The subscriber can enter more than one e-mail address.

Additionally, in an embodiment, the subscriber can set an authorization schedule for each e-mail address. For example, if the subscriber enters two e-mail addresses, a personal e-mail address and work e-mail address, the subscriber can only authorize e-mails sent from the work e-mail address during business hours and use the personal e-mail address during non-business hours.

Additionally, in an embodiment, the subscriber can assign certain control rights to each e-mail address. One e-mail address can have complete control authority. A second e-mail address might only be able to arm the local security system 120 without being able to disarm the system. Accordingly, each authorized e-mail address can have different control levels or authority. For example, a security officer in a commercial building can have the highest level of authority, i.e., complete control of all functions. An employee might only be able to arm or disarm the security system. Using the website, the subscriber can program each function or feature that each authorized e-mail address can control. Alternatively, the subscriber can program a function or feature that an authorized e-mail address cannot control.

Further, in another embodiment, the subscriber can set a period for which the e-mail address has control authority, e.g., a predetermined time period, and after such a period expires, the e-mail address would no longer have any control authority. The feature provides several advantages. For example, an employer can control access to the security system based simply by using an expiring e-mail access. This is particularly useful if there is a high turnover in employment. Additionally, this feature allows for an owner of a security system to provide limited access to a security system for houseguests by only allowing a houseguest to have a short-term control authority. The subscriber can also include a parameter that specifies if the limited e-mail access time period will be automatically renewed or require a manual renewal. For example, the e-mail authority can be renewed automatically every Monday.

Additionally, in an embodiment the subscriber can request a confirmation that the control function was executed. An e-mail address can be sent which is a confirmation of all requests even if another user performs a command via e-mail.

Once all of the desired control and authority fields are entered into the website, the web server 225 will forward all of the information to the central database 220 for storage as a data record. The system will then assign a branded e-mail address, which is used as a message destination for all control e-mails.

Figure 6:
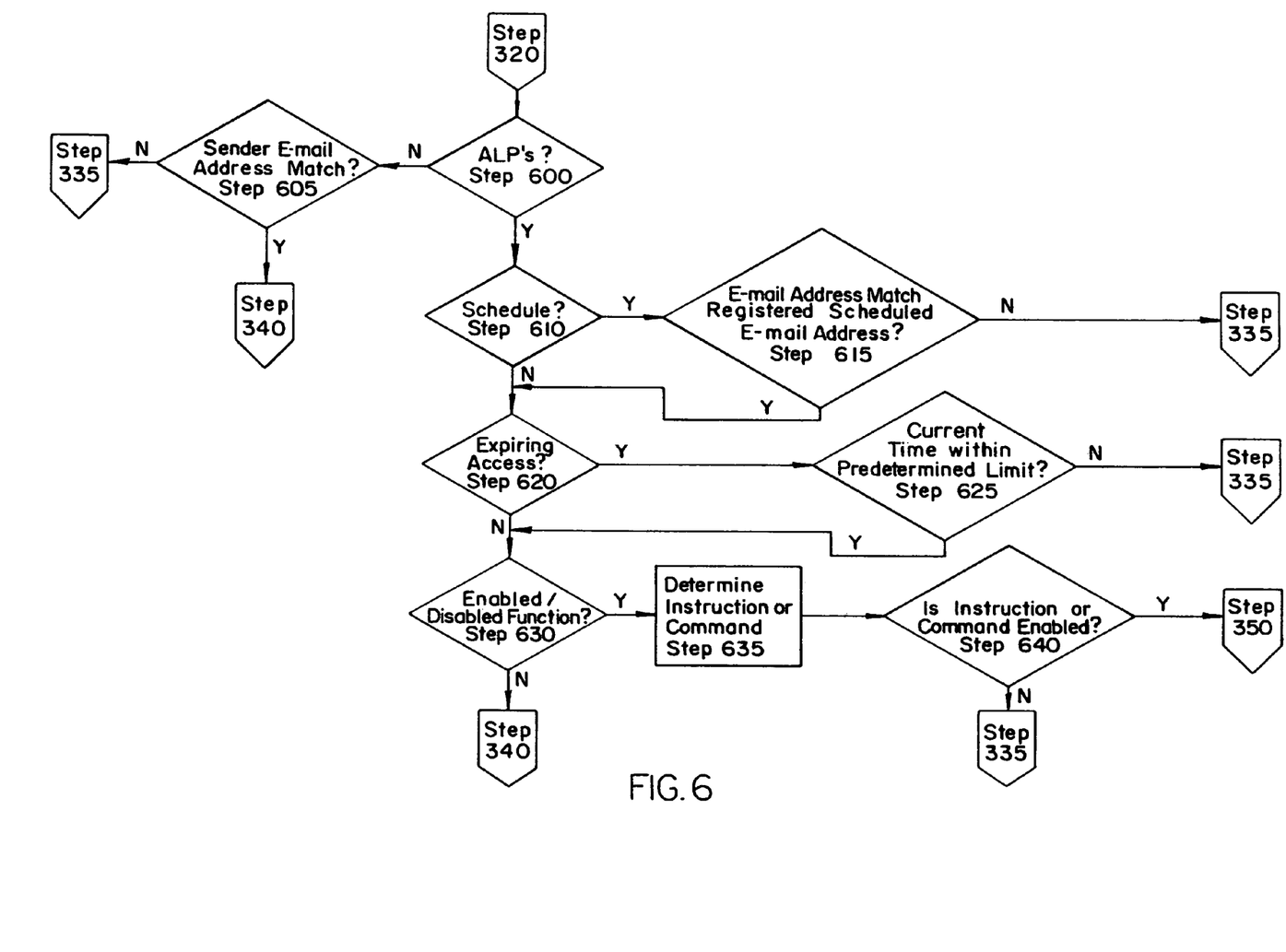
FIG. 6 illustrates a flow chart for the authorization process with ALPs for the first embodiment of the invention.

FIG. 3 illustrates the control process including the authorization step without any authorization limiting parameters (ALPs). FIG. 6 illustrates the authorization process with ALPs. An ALP includes a limiting schedule, disabled or enabled control functions or a limited control time period.

The authorization process begins after the authentication step 320. The message processor 205 will determine if an ALP was registered for the sender's e-mail address, at step 600. The message processor 205 will search the central database 210 for an indication that an ALP was entered during the registration process. If an ALP was entered and stored in the central database, it will be indicated by a flag or header and stored with each e-mail address.

If no ALP corresponds with the sender's e-mail address, then the message processor 205 will determine if the sender's e-mail address is authorized to control the local security system 120. If no match is found, then the process ends at step 335. If a match is found, i.e., both e-mail address and subscriber number, then the process proceeds to step 340 and the intended control instruction or command is determined.

If, however, at step 600, the message processor 205 determines that an ALP exists, the message processor 205 will determine the type of ALP. As depicted in FIG. 6, the first ALP that the message processor 205 will check is a "schedule". This is only for the purpose of the description, in operation; the order of determination can be varied. If no schedule was programmed during registration, the process will then determine if an expiring access limitation was requested, at step 620.

However, if at step 610 a schedule was input, the message processor 205 will determine if the sender's e-mail address is received within the scheduled time. The message processor will use its internal clock for the time and compare the time that the e-mail was received with the registered time for the e-mail address. If the e-mail was received "out of schedule", i.e., if the e-mail was received during a time period outside the preset schedule, the process will end, at step 335. For example, an e-mail that is received at 6:00 PM from an e-mail address that is only scheduled to be able to control the local security system 120 between 9:00-5:00 will not be able to control the local security system 120. The request will be denied and the process will end, step 335. In one embodiment, an e-mail can be sent from the NOC 110 to the remote e-mail terminal 100 indicating that the request was denied with some error message such as user out-of-schedule. Since the programmed schedule is based upon local time, the NOC 110 will be aware of the time zone in which the local security system 120 is located.

If the e-mail is received within the scheduled period of time, the message processor 205 will then determine if another ALP was associated with the sender's e-mail address at step 620. At step 620, the message processor-205 will search the subscriber record for the sender's e-mail address sub-record to determine if an expiring access limitation was associated with the sender's e-mail. If no such limitation was set for the sender's e-mail address, then the message processor 205 will determine if another ALP was set for the sender's e-mail address, at step 630.

However, if at step 620, the message processor 205 finds an expiring access limitation stored in the expiring access field, the message processor 205 will determine if the e-mail was received within the predetermined period of time. The message processor will use an internal date, time and year for the determination and compare the date and time when the e-mail was received from the sender with the preset period of time. If the date and time that the e-mail was received is outside the preset period of time, the process will end at step 335 and control access will be denied. Again, an e-mail can be sent from the NOC 10 to the remote e-mail terminal 100 indicating that user access has expired.

If the e-mail is received within the preset expiring access period of time, the message processor 205 will then determine if another ALP was associated with the sender's e-mail address, at step 630. At step 630, the message processor 205 will search the subscriber record for the sender's e-mail address sub-record to determine if a limitation on the particular control function or feature was associated with the sender's e-mail. If no such limitation was set for the sender's e-mail address, then the message processor 205 will proceed to step and determine the function.

If there is a feature limitation associated with the sender's e-mail address, the authorization step and feature determination step is merged into the authorization process. At step 635, the message processor 205 will determine the instruction or intended control by parsing the header section of the e-mail message, in the same manner as described above for step 340.

Once the instruction or intended control feature is identified by the message processor 205, message processor 205 will determine if the identified instruction is enabled or disabled for the sender's e-mail address. If the identified instruction is disabled for the sender's e-mail address, the process ends at step 335 and authorization is denied. An e-mail can be sent that request has been denied.

If the identified instruction is enabled, the process proceeds to step 350. The message processor 205 will send the instruction to the transmission section 215 for transmission to the local security system 120.

As described above, the message processor determines if various ALPs are associated with a particular e-mail address. The determination is based upon detecting a parameter in the header section for the field.

Figure 7:
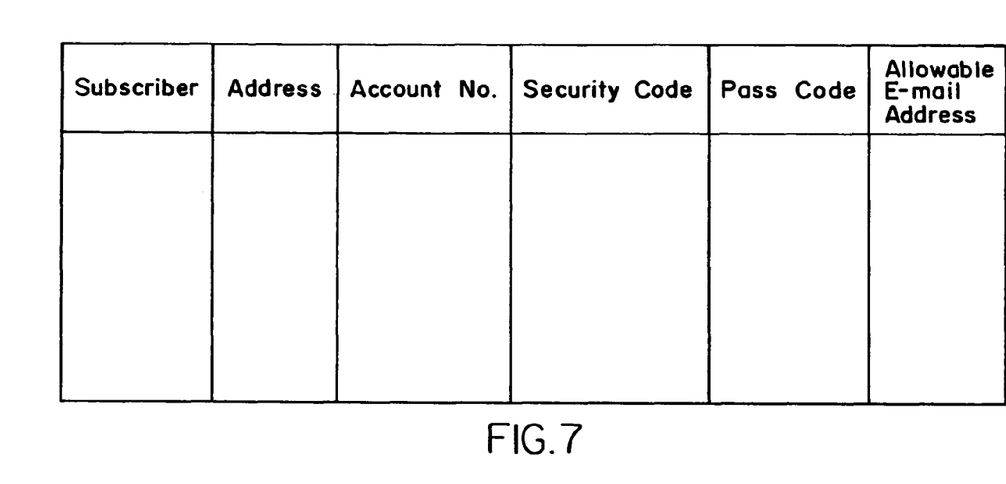
FIGS. 7 and 8 illustrate an example of a subscriber record and e-mail authority sub-record.
Figure 8:
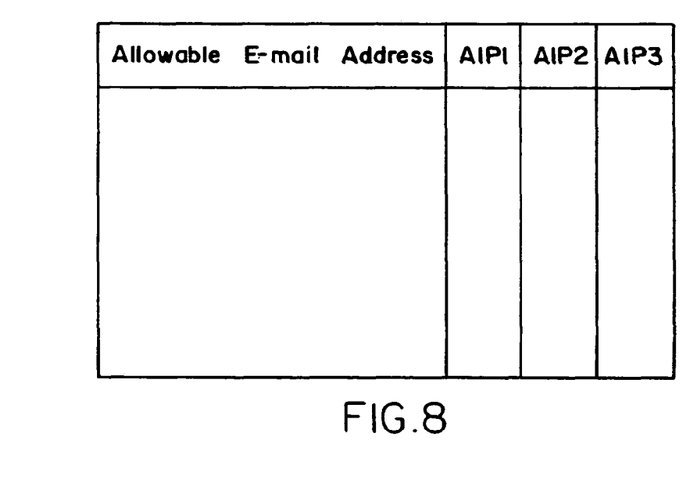

FIGS. 7 and 8 illustrate an example of a subscriber record and e-mail sub-record. For each allowable e-mail address, the central database can include a separate sub-record that contains all enabled ALPs.

Figure 9:
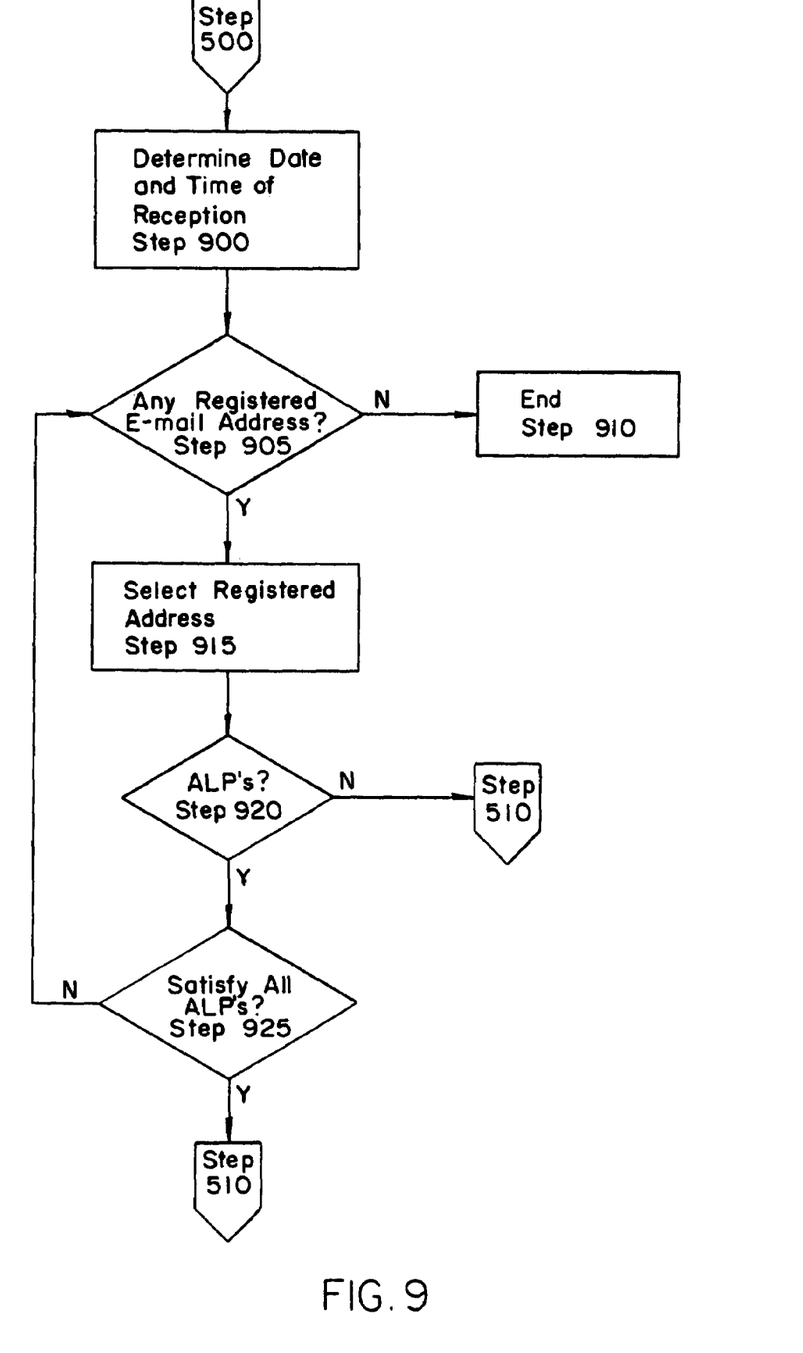
FIG. 9 illustrates a flow chart of a first modification to the method of second embodiment of the invention when there is at least one ALP.

FIG. 9 illustrates the control method according to a second embodiment of the invention with ALPs. Only the additional steps are depicted in FIG. 9. As illustrated in FIG. 9, the additional steps occur between step 500 of receiving the e-mail and step 510 transmitting an e-mail message to a registered e-mail address.

If there are no ALPs, the process proceeds in the same manner as depicted in FIG. 5. If there are ALPs, the message processor 205 will only proceed to step 510 and transmit an e-mail to a registered e-mail address if there is a registered address that satisfies the ALPs. All registered e-mail addresses that do not meet the ALPs will be eliminated.

At step 900, the message processor 205 will determine the date and time when the e-mail was received. The date and time will be used as a basis for a determination of whether a particular registered e-mail satisfies the ALPs. At step 905, the message processor 205 will search that central database for the corresponding subscriber record and any registered e-mail addresses. If there are no registered e-mail addresses, the process ends, at step 910. The authentication and authorization process is finished, and control access is denied.

If there are registered addresses, the message processor 205 will send an e-mail to the first e-mail address that satisfies the ALPs for the e-mail address. At step 915, the message processor 205 will select the first registered e-mail address and test the address. The testing will include determining an ALP is associated with the first registered e-mail address. If not, the process will proceed to step 510 and operate in accordance with the process described in FIG. 5.

If there is at least one ALP, the message processor 205 will determine if each ALP is satisfied for the first registered e-mail address. This determination is made in the same manner as described above. For example, if the e-mail was received outside of the scheduled period of time for the first e-mail address, the first e-mail address will be eliminated. Additionally, the message processor 205 will determine the instruction and intended control feature. If the identified control feature is not enabled, e.g., disabled for the first e-mail address, the e-mail address will be eliminated. Steps 905, 915, 920 and 925 will be repeated for each subsequent registered e-mail addresses until an e-mail address that satisfies all of its corresponding ALPs is located or until no e-mail addresses are remaining. If no e-mail address satisfies all of the ALPs, the process will end at step 910. The authentication and authorization process is finished and control will be denied.

Once one e-mail address satisfies its ALPs, the process will proceed to step 510 and the process will operate in the manner as described in FIG. 5.

In an embodiment, the control system can also send a confirmation e-mail stating that the instruction or intended control was carried out. In an embodiment, the subscriber can request a confirmation. In another embodiment, a confirmation can be included as a default.

A confirmation will be sent after the local security system 120 executes the intended control function and transmits its status to the NOC 110.

While the above-identified method and system has been described as being using to control or modify a function of the local security system 120, the e-mail control system can also be used to request and receive status reports regarding the local security system 120. The status reports can be sent to the same e-mail address that is registered for controlling the local security system 120. Alternatively, the subscriber can register, using the website, a different e-mail address for requesting and receiving status reports. Additionally, the subscriber can choose from which information the subscriber wishes to receive reports.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of remotely controlling a plurality of security systems comprising the steps of:

a. providing a network operating center for the plurality of security systems remotely located from each of the plurality of security systems that controls an operational state of the security systems through a plurality of control commands including at least an arm command that arms a security system of the plurality of the security systems to detect an undesired access into a premises protected by the security system and a disarm command that disarms the security system;

b. providing a plurality of destination e-mail addresses within the network operating center that are pre-assigned by the network operating center to respective users of the plurality of security systems for receiving control commands from the users;

c. the network operating center receiving an e-mail message from a remote e-mail terminal operated by a user that contains at least one control instruction for controlling the security system of the plurality of security systems;

d. authenticating the e-mail message based upon at least one authentication criterion, wherein the authentication includes: searching a central database for a registered e-mail address that corresponds to subscriber information included in the e-mail message, assigning a random transaction number to an outgoing e-mail message, and transmitting the outgoing e-mail message to the registered e-mail address with the random transaction number;

e. authorizing a sender of the e-mail message by matching at least a destination e-mail address of the received e-mail message with one of the plurality of pre-assigned destination e-mail addresses;

f. transmitting the at least one control instruction to the security system if the e-mail message is authenticated and the sender is authorized; and g. executing the at least one control instruction, wherein the authorizing of a sender of the email message includes the sub-step of determining if an authorization limiting parameter (ALP) includes a time or function limiting schedule and, if so, determining if the e-mail message is in compliance with the time or function limiting schedule.

2. The method according to claim 1, wherein said e-mail message is encrypted.

3. The method according to claim 2, wherein said e-mail message includes personal information, a sender identifier, a security subscriber account number, a security identification and said at least one control instruction in the e-mail message.

4. The method according to claim 3, wherein the authenticating step includes comparing the personal information and security identification with information stored in a central database.

5. The method according to claim 3, wherein the authorizing step includes comparing the sender's e-mail address with an e-mail address that is previously registered and stored in a central database.

6. The method according to claim 1, wherein the authorizing step further includes the sub-step of determining if an authorization limiting parameter (ALP) corresponds to the e-mail address.

7. The method according to claim 1, wherein the steps of authenticating and authorizing includes the sub-step of parsing the e-mail message for authentication and authorization parameters.

8. The method according to claim 1, further comprising the step of assigning a branded e-mail address used as a destination for the e-mail message.

9. The method according to claim 1, further comprising the steps of maintaining a website that is accessible to a subscriber, said website is capable of receiving at least one e-mail address that the subscriber authorizes to send the at least one control instruction;

storing the at least one e-mail address in a central database in a subscriber record.

10. the method according to claim 1, wherein the authentication further includes:

a. waiting for a preset period of time for a response to the outgoing e-mail message from the registered e-mail address; and b. denying authentication if the response is not received within the preset period of time or not received from the registered e-mail address.

11. The method according to claim 1, further comprising the step of determining the at least one control instruction.

12. The method according to claim 2, wherein encryption software can be downloaded to the remote e-mail terminal from a website maintained by a web server.

13. The method according to claim 12, further comprising the steps of:

a. assigning an encryption key to an subscriber;

b. assigning a corresponding decryption key which can decrypt an email encrypted by the encryption key; and c. storing the decryption key.

14. The method according to claim 13, wherein said encryption key is unique for each subscriber and said corresponding decryption key is unique, said corresponding decryption key is stored in a central database and associated with a subscriber record for each subscriber.

15. The method of claim 1, further comprising determining if said received e-mail is junk.

16. The method of claim 1, wherein said e-mail is junk if it is not in an accepted format.

17. A network operation center comprising:

a. an e-mail reception and transmission section including a plurality of destination e-mail addresses, each pre-assigned to a person authorized to control and access features of one of a plurality of security systems remotely located from the network operation center, the e-mail reception and transmission section receiving and transmitting e-mails between a plurality of remote e-mail terminals operated by authorized users and the network operation center, the received e-mails each including at least one control instruction for controlling a remote security system of the plurality of security systems, control commands including at least an arm command that arms the security system to detect an undesired access into a premises protected by the security system and a disarm command that disarms the security system;

b. a message processor for receiving an e-mail for a remote security system of the plurality of security systems from the e-mail reception and transmission section and for authenticating and authorizing control of the remote security system based upon at least certain information contained in the e-mail, the authorization including at least matching a destination e-mail address of the received e-mail with one of the plurality of pre-assigned destination e-mail addresses, and the authentication including at least searching a central database for a registered e-mail address that corresponds to subscriber information included in the e-mail message, assigning a random transaction number to an outgoing e-mail message, and transmitting the outgoing e-mail message to the registered e-mail address with the random transaction number;

c. a central database including subscriber information separated into subscriber records, the subscriber records capable of including at least one e-mail address authorized to control the remote security system, the message processor is capable of accessing the subscriber information in the central database for authenticating and authorizing; and d. a transmission section for receiving the at least one control instruction from the message processor and transmitting the at least one control instruction to the remote security system wherein the message processor determines if an authorization limiting parameter (ALP) includes a time or function limiting schedule and, if so, determining if the e-mail message is in compliance with the time or function limiting schedule.

18. The network operation center according to claim 17, further comprising a web server that maintains a website that is accessible to a subscriber, said website is capable of receiving at least one e-mail address that the subscriber authorizes to send the at least one control instruction, said web server forwards all subscriber information to said central database.

19. The network operation center according to claim 18, wherein encryption software and encryption keys are available for downloading from the web server.

* * * * *